Figure 1:
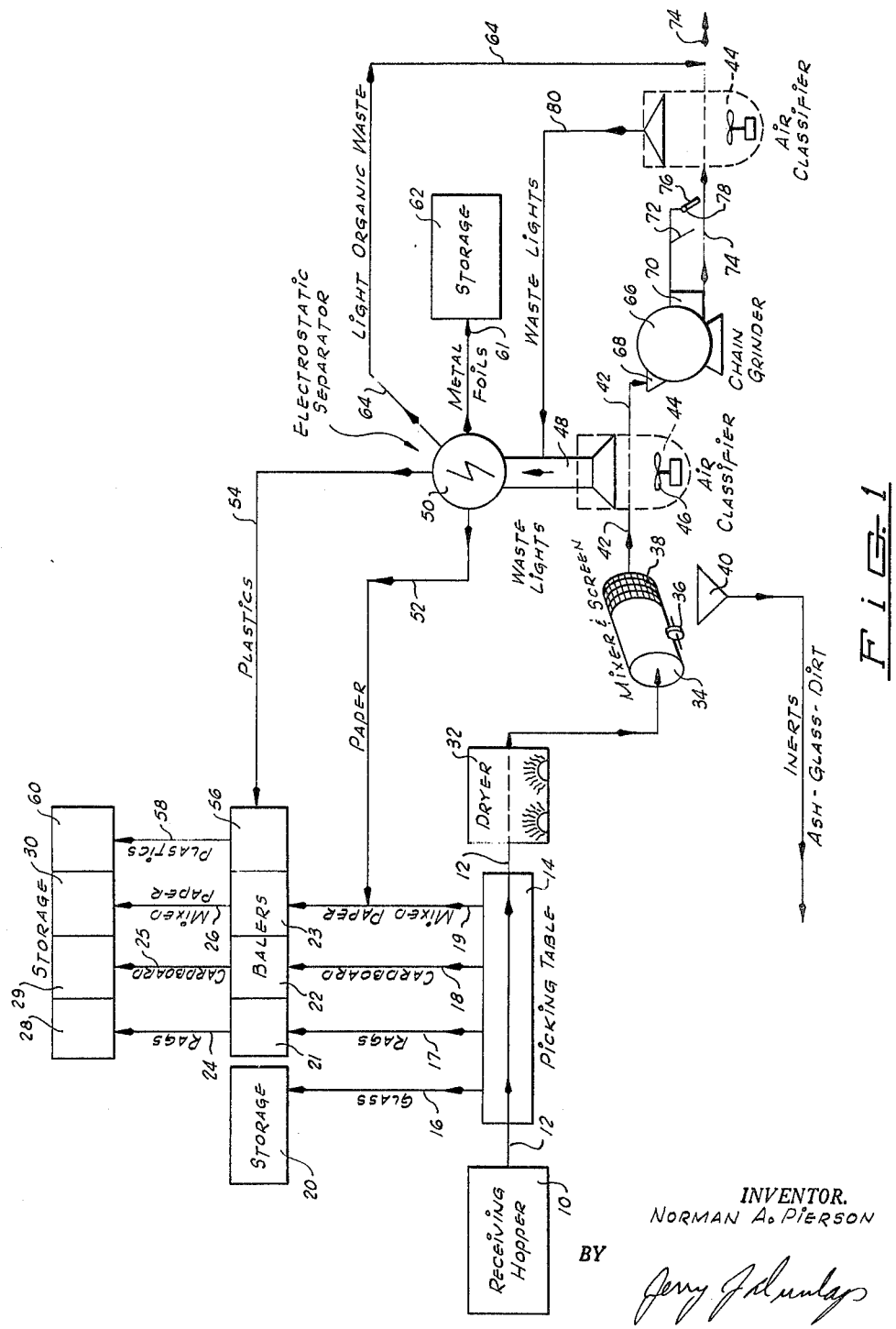

Feb. 22, 1966  N. A. PIERSON  3,236,604
SYSTEM FOR TREATING MUNICIPAL REFUSE
Filed Oct. 3, 1960  2 Sheets-Sheet 1

INVENTOR.
NORMAN A. PIERSON
BY
Jerry J. Dunlap
ATTORNEY

INVENTOR.
NORMAN A. PIERSON
BY
ATTORNEY

United States Patent Office 3,236,604
Patented Feb. 22, 1966

3,236,604
SYSTEM FOR TREATING MUNICIPAL REFUSE
Norman A. Pierson, P.O. Box 755, Norman, Okla.
Filed Oct. 3, 1960, Ser. No. 59,922
7 Claims. (Cl. 23—259.1)

This invention relates generally to the reclamation of waste materials. More particularly, but not by way of limitation, this invention relates to a system for reclaiming municipal refuse.

As it is well known in the art, municipal refuse contains a wide variety of materials, many of which are valuable if they can be economically reclaimed. At the present time, very few of the materials in municipal refuse are reclaimed. In the majority of municipalities, all of the refuse is trucked to a common area and either burned or merely burned on long trenches. It is common practice to have workers manually pick cardboard and rags from stacks of the refuse, but these two materials represent a minor portion of the valuable materials in the refuse, and the refuse is not properly presented for an efficient manual picking operation.

Fairly recently economically feasible systems have been made commercially available for either converting municipal refuse by bacterial decomposition, or subjecting it to a distillation type of process. When the refuse is subjected to bacterial decomposition, which is normally called composting, a large percentage of the materials in the refuse are converted to a humus which can be used in the nature of a fertilizer as a soil conditioner. When the refuse is submitted to distillation, a large portion of the refuse is converted to charcoal, and valuable gases, principally methane, are recovered from the distillation process. As presently developed, however, these systems reclaim only organic portions of the refuse, along with some manual picking of cardboard and rags. No provision has been made for recovering such valuable materials as glass, mixed paper, plastics, metal foils, tin cans, other magnetic metals, non-magnetic metals, bones, wood, and small pieces of wool, silk and cotton, which are all normally present in municipal refuse.

The present invention contemplates a novel system for reclaiming all of the valuable components or materials in a waste material such as municipal refuse with a minimum of manual labor required and with a minimum cost. Broadly stated, the present invention may be defined as a refuse reclamation system comprising:

(a) A manual picking table,
(b) Means for conveying the refuse over the picking table at a depth for manual observation and removal of salvageable components from the refuse,
(c) A refuse grinding apparatus,
(d) Means for conveying the unsalvaged refuse from the picking table into the grinding apparatus,
(e) A light products separation apparatus,
(f) Means for passing the refuse through the light products separation apparatus for removal of paper, plastics, metal foils, and the like from the refuse,
(g) Means for removing metals from the heavier ground refuse discharged from the light products separation apparatus,
(h) A refuse distillation apparatus,
(i) A refuse composting apparatus, and
(j) Means for conveying the refuse remaining after removal of metals to the distillation apparatus, and, alternately, the composting apparatus.

A important object of this invention is to make the disposal of municipal refuse an economical operation, rather than a liability to municipalities.

Another object of this invention is to recover or reclaim all of the valuable components of municipal refuse and convert the remainder of the refuse to one or more useful products. More specifically, an object of the present invention is to reclaim all of the valuable glass, fabrics, paper, cardboard, plastics, metal foils and metals from municipal refuse and convert all, or substantially all, of the organic materials in the refuse to either compost or to charcoal, methane gas, and an end product known as cresotars, which is a by-product of a distillation type of system and which is useful for, among other things, a wood preservative.

A further object of this invention is to reclaim valuable materials from municipal refuse in the most economical manner.

Another object of this invention is to disposed of municipal refuse in an economical manner with a minimum of manual labor required.

Other objects and advantages of the invention will be evident from the following detailed description, when read in conjunction with the accompanying drawings which illustrate my invention.

Figure 2:
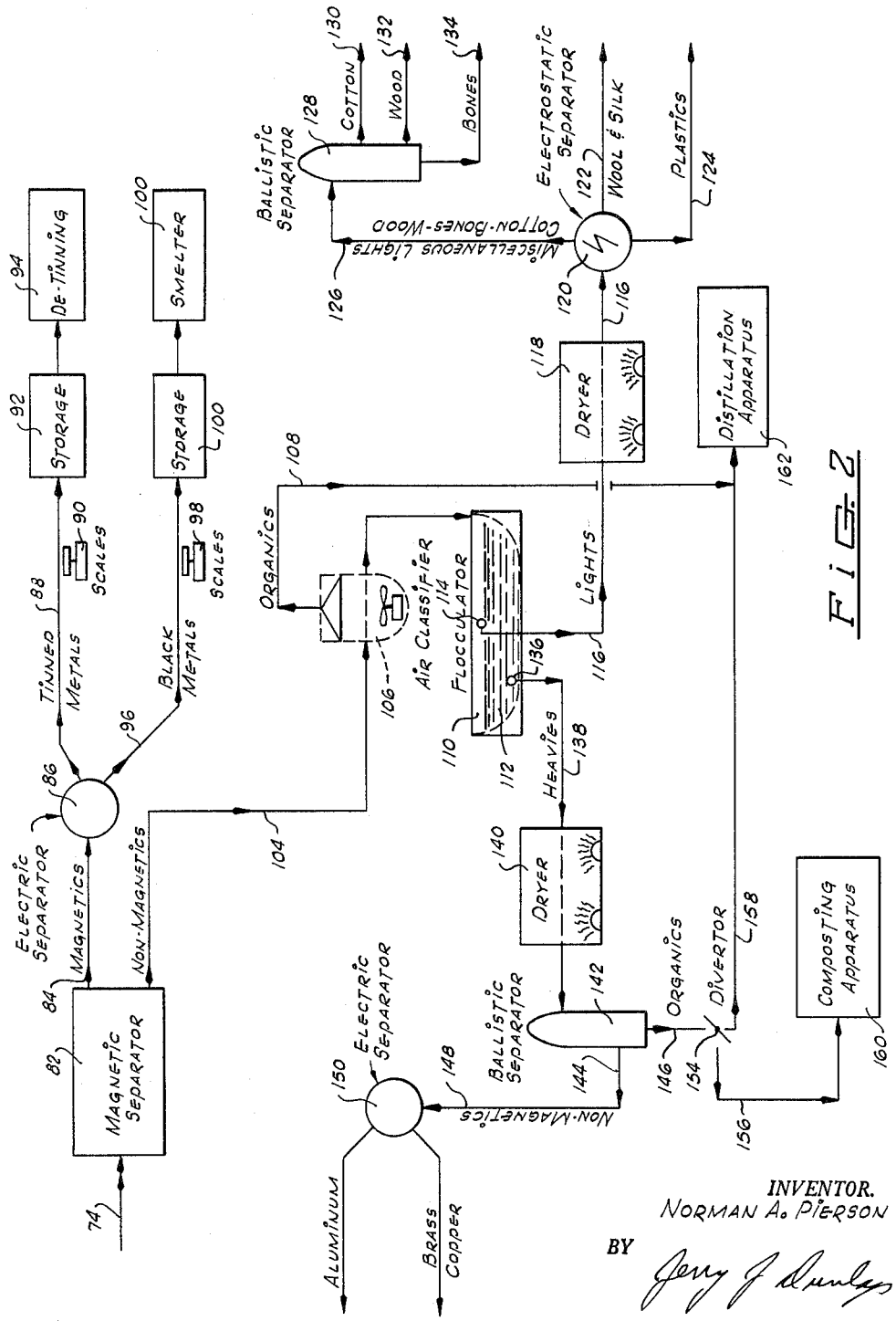

In the drawings:

FIGURES 1 and 2 comprise a schematic flow diagram of a system constructed in accordance with the present invention. FIGURE 1 illustrates substantially the first half of the system and FIGURE 2 illustrates the remainder of the system, with FIG. 2 being a continuation from the right-hand end of FIG. 1.

Referring to the drawings in detail, and particularly FIG. 1, reference character 10 designates a receiving hopper of any desired design into which refuse from mumicpal refuse collection trucks is dumped. A suitable conveyor 12 extends from the receiving hopper 10 to convey the refuse over a manual picking table 14 at such a depth that workers standing at the picking table 14 can observe and manually remove larger valuable materials from the refuse. In a preferred embodiment, the conveyor 12 extends from the lower portion of the receiving hopper 10 and conveys the refuse over the picking table 14 at a depth of about one foot, which will make the various manually separable materials in the refuse clearly visible to workers standing at the picking table 14.

Four conveyors 16, 17, 18 nd 19 extend at substantially right angles to the picking table 14 and extend sufficiently close to the picking table 14 that workers can place materials thereon which are picked from the picking table 14 without the necessity of the workers carrying the materials any appreciable distance. The conveyors 16–19 are provided to receive glass, rags, cardboard and mixed paper, respectively, which workers standing at the picking table remove from the refuse and place thereon. The conveyor 16 moves the picked glass into a suitable storage hopper 20, from which the glass may be periodically collected and sold to appropriate customers. The rags, cardboard and mixed paper are moved by the conveyors 17, 18 and 19 into individual balers 21, 22 and 23, respectively, by means of which these separate materials are automatically packed in bales convenient for shipping to the appropriate customers. Preferably, additional conveyors 24, 25 and 26 extend from the balers 21, 22 and 23 to suitable storage hoppers 28, 29 and 30 in which the separate bales may be stored prior to shipment to the appropriate customers.

General municipal refuse frequently has a moisture content of about 25 percent. This moisture accumulates on the lighter materials in the refuse, such as paper, plastics and metal foils, and sometimes interferes with the removal of these light materials from the refuse. Therefore, the present invention contemplates a dryer 32 through which the refuse may be moved by the conveyor 12 after the main stream of the refuse leaves the picking table 14. The dryer 32 may be of any desired construction and utilize any desired energy source, although I prefer to use gas as the energy source, for purposes which will be described. The dryer 32 is operated at such a temperature that the moisture collected on the lighter materials in the refuse will be driven off, yet at least the major portion of the moisture absorbed in heavier and organic portions of the refuse will still remain therein when the refuse leaves the dryer. The temperature maintained in the dryer 32 will depend upon the moisture content and the composition of the particular municipal refuse being handled. Therefore, this temperature will vary through a wide range, but will normally be between 250 and 500 degrees F.

The refuse passed through the dryer 32 is fed into a mixing drum 34 being rotated by suitable drive rollers 36, only one of which is shown. The mixing drum 34 may be of any desired construction which will provide a thorough mixing of the refuse moving therethrough. For example, the mixing apparatus 34 may be in the form of a device shown in U.S. Patent No. 2,797,051 which will not only thoroughly mix the refuse, but will also slightly reduce the particle size of the refuse. However, insofar as the present invention is concerned, no reduction in particle size is required to be obtained by use of the mixing apparatus 34. A suitable screen 38 is mounted on the discharge end of the mixing apparatus 34, such that rather fine particles of ash, glass and dirt will be screened out of the refuse and dropped into a suitable receiving hopper 40 for disposal in any desired manner. The screening out of the fine inert particles of ash, glass and dirt is facilitated by the previous drying of the refuse, and it will be observed that these materials are removed in an initial stage of the present system to prevent the necessity of handling these materials through a large portion of the system.

The mixed refuse is moved by a suitable conveyor 42 through a light products separation apparatus 44 for removal of the lighter components or materials in the refuse. The separation apparatus 44 may be conveniently in the form of what is known in the art as an air classifier utilizing a fan 46 for blowing a stream of air through the refuse pneumatically removing the lighter components of the refuse. These lighter components are moved by a conveyor 48 into another separation apparatus 50 which is provided for separating paper, plastics, metal foils and light organic wastes from one another. In a preferred embodiment of this invention, the separator 50 is an electrostatic type of separator utilizing an oscillating conveyor with appropriate materials on the conveyor for inducing charges on the paper, plastics and metal foils, thereby allowing removal of these materials in accordance with the charges thereon. With this type of apparatus, the light organic wastes, such as potato peelings, for example, do not accept a charge and can be easily separated from the remaining light products.

The paper separated by the separator 50 is moved by a conveyor 52 onto the conveyor 19 previously described. Plastics removed by the separator 50 are moved by a suitable conveyor 54 to a baler 56 for packing the plastics in bales. The baled plastics are moved by a conveyor 58 into a suitable storage bin 60 prior to sale to an appropriate customer. The metal foils removed by the separator 50 are moved by a suitable conveyor 61 to a storage hopper, or the like 62, where the foils are periodically collected and sold. The light organic wastes removed by the separator 50 are moved by a suitable conveyor 64 back into the main stream of the refuse, as will be described.

The heavier portions of the mixed refuse are moved by the conveyor 42 from the separation apparatus 44 into a suitable grinding apparatus 66 which will reduce the particle size of the refuse to the desired extent. In a preferred embodiment of this invention, the grinder 66 is in the form of a chain-type grinder having an inlet 68, a discharge 70, and which will reduce the particle size of at least the non-metallic portions of the refuse to two inches or less. When using a chain-type grinder 66, the materials will be thrown from the discharge 70 of the grinder at a substantial velocity and will tend to accumulate or agglomerate on any structure in the path of movement. Therefore, I prefer to provide a deflector or baffle plate 72 supported in any suitable manner to extend downwardly and outwardly with respect to the grinder discharge 70. The baffle plate 72 is supported in the path of movement of the materials discharged from the discharge 70 of the grinder, and the materials are deflected downwardly onto a suitable conveyor 74. The baffle 72 is preferably disposed at an angle of at least 60 degrees from the vertical to prevent the bridging of the ground refuse between the baffle and the conveyor 74. Also, I provide a scraper plate 76 supported by a suitable hinge 78 downstream of the baffle plate 72 to regulate the depth of the refuse on the conveyor 74. The scraper plate 76 rides on the top of the refuse on the conveyor 74, thereby tending to regulate the height of the refuse. The scraper plate 76 is hingedly supported to allow any large articles moved by the conveyor 74 to pass thereunder without damage to either the conveyor or the scraper plate.

The mixed and ground refuse is moved by the conveyor 74 at a regulated depth through another light products separation apparatus 44 for removal of any light materials in the refuse which are made available by reason of the grinding of the refuse by the grinder 66. These light materials are moved by a conveyor 80 back to the conveyor 48 for feeding to the separator 50, along with the light products removed by the first light products separation apparatus 44, previously described. It will also be noted that the light organic waste materials separated by the separator 50 are moved by the conveyor 64 back to the conveyor 74 downstream of the second light products separation apparatus 44 to be recombined with the main stream of refuse.

As illustrated in the upper left-hand portion of FIG. 2, the main stream of refuse is then moved by the conveyor 74 into a suitable magnetic separator 82 in which the magnetic metals are separated from the remainder of the refuse, that is, all non-magnetic portions of the refuse. The separated magnetic metals are moved by a conveyor 84 from the separator 82 to a suitable separator 86 designed for separating the tinned metals from the black metals. The separator 86 may be of any desired design, such as an electrical type of separator made by the English company of Townson and Mercer, Ltd., Beddington Lane, Croyden, Surrey. The separated tinned metals are moved by a suitable conveyor 88 over suitable scales 90 for maintaining a record of the weight of these metals and then into a suitable storage hopper 92 for periodic removal and sale. In a completely integrated system, the tinned metals are moved from the storage hopper 92 into a de-tinning apparatus 94 where the valuable tin on these metals can be separated and sold separately from the remainder of the metal.

The black metals separated by the separator 86 are moved by a suitable conveyor 96 over another set of scales 98 to a storage hopper 100. These metals may then in turn be moved to a suitable smelter 102 for conversion to ingots for more convenient sale.

The non-magnetic portion of the refuse passed through the magnetic separator 82 is moved by a suitable conveyor 104 to another light products separation apparatus 106. The light products separation apparatus 106 may conveniently be another air classifier utilizing a stream of air passing through the refuse for removal of any desired portion of the refuse. The separation apparatus 106 is provided to remove a percentage of the organic materials in the main stream of refuse which are conveyed by a conveyor 108 to a subsequent portion of the system, as will be described below.

The refuse not removed by the separation apparatus 106 is fed into a flocculator 110 of any desired type having a liquid medium 112 therein for a flotation type of separation of the lighter and heavier portions of the refuse. The flocculator 110 is provided with an upper discharge outlet 114 through which the desired lighter portions of the refuse are removed from the flocculator. At this stage of the present process, these light materials will normally be small particles of wool, silk, cotton, bones, wood and plastics which were not removed by the light products separation apparatuses 44 and 106. These light products are moved by a suitable conveyor 116 through a dryer 118 for removal of substantially all of the moisture therefrom which was acquired by passage of the materials through the flocculator 110. The dryer 118 is preferably a gas-fired dryer, for purposes to be described. The dried light products are moved on by the conveyor 116 into a suitable separator 120. When the separator 120 is an electrostatic type of separator, the wool and silk will be removed together and can be moved by a conveyor 122 to any desired storage point. The plastics will be removed separately by the separator 120 and are moved by a conveyor 124 to any desired point, such as back to the plastic baler 56 illustrated in FIG. 1 and previously described. The cotton, bones and wood will be removed together by the separator 120 and are then conveyed by a conveyor 126 to another separator 128 for further separation. The separator 128 is preferably a ballistic type of separator having three separate discharge outlets 130, 132 and 134 for removal of the cotton, wood and bones, respectively. These end products can then be sold to appropriate customers.

The flocculator 110 is also provided with a lower discharge outlet 136 through which the heavier portions of the refuse fed to the flocculator 110 are removed. These heavier portions, which will comprise non-magnetic metals and organic materials, are moved by a conveyor 138 through another dryer 140 and into a suitable separator 142. The dryer 140 will remove the major portion of the moisture from the refuse moved therethrough to facilitate operation of the separator 142. The separator 142 is preferably a ballistic type of separation having two discharge outlets 144 and 146. Since the refuse being fed to the separator 142 will contain only non-magnetic metals and organic materials, the metals may be easily separated from the organic materials and removed through the discharge 144. These non-magnetic metals are moved by a conveyor 148 to another suitable separator 150, such as the electrical type of separator manufactured by Townson and Mercer, as described above. The separator 150 is of a type to separate the aluminum from brass and copper, such that these metals may be sold separately at substantially higher returns than is possible with mixed metals.

The organic materials passing through the separator 142 are fed into a discharge chute 146 having a diverting device 154 on the lower end thereof. The diverting device 154 can easily be constructed in the form of a damper or pivotally supported plate to direct the material moved through the chute 146 onto either of two conveyors 156 or 158. The conveyor 156 leads to a suitable composting apparatus 160 by means of which the refuse may be converted to a compost by bacterial decomposition, as described above. The composting apparatus 160 may be of any desired type, such as the type manufactured by Lockheed Aircraft Company of Burbank, California.

The conveyor 158 is used to feed the organic materials to a distillation apparatus 162 by means of which the organic materials are converted to charcoal, methane gas and cresotars. The distillation apparatus 162 may be of any suitable type, such as that manufactured by Lockheed Aircraft Company of Burbank, California. It will also be noted that the conveyor 108 leading from the light products separation apparatus 106 may be used to feed organic materials directly from the separation apparatus 106 to the conveyor 158 moving to the distillation apparatus 162. Therefore, when the organic materials contained in municipal refuse are to be subjected to the distillation apparatus 162, a substantial portion of thes organic materials may be bypassed around the flocculator 110 and fed directly to the distillation apparatus. Organic material fed to the distillation apparatus 162 is preferably as dry as possible for the most economical operation. Thus, the organic materials moved by the conveyor 108 will not be subjected to the liquid in the flocculator 110 and will provide substantial economy in the complete reclamation system. Approximately 50 percent of the organic materials moved by the conveyor 104 through the separation apparatus 106 may be removed and fed by the conveyor 108 and the conveyor 158 directly to the distillation apparatus 162 without interfering with the efficient operation of the flocculator 110 and related apparatus, to result in substantial economy.

From the foregoing it will be apparent that the present invention will make the disposal of municipal refuse an economical operation, rather than a liability as it presently is in most municipalities. The present system provides for the removal of all valuable materials in municipal refuse for separate sale at the most attractive prices. Those portions of the refuse which are not valuable and which cannot be converted either to compost or to charcoal, methane and cresotars are removed in the earlier stages of the system, and the remaining portion of the refuse is separated and disposed of in the most economical and convenient manner with a minimum of manual labor required. It will further be apparent that the present system is simply designed and may be economically manufactured.

Changes may be made in the combination and arrangement of parts or elements as heretofore set forth in the specification and shown in the drawings, it being understood that changes may be made in the embodiments disclosed without departing from the spirit and scope of the invention as defined in the following claims.

I claim:

1. A refuse reclamation system, comprising:
   a manual picking table;
   means for conveying the refuse over the picking table at a depth for manual observation and removal of salvageable components from the refuse;
   a refuse grinding apparatus;
   means for conveying the unsalvaged refuse from the picking table into the grinding apparatus;
   a light products separation apparatus;
   means for conveying the refuse from the grinding apparatus through the light products separation apparatus for removal of paper, plastics, metal foils, and the like from the refuse;
   means for removing metals from the heavier ground refuse discharged from the light products separation apparatus;
   a refuse distillation apparatus;
   a feed conveyor leading to the distillation apparatus;
   a refuse composting apparatus;
   a feed conveyor leading to the composting apparatus; and
   means for directing the refuse remaining after removal of metals to the distillation apparatus feed conveyor in one position thereof and to the composting apparatus feed conveyor in a second position thereof.

2. A system as defined in claim 1 characterized further to include bailing means for rags, cardboard and mixed paper, and means for conveying rags, cardboard and paper removed from the picking table to said bailing means.

3. A system as defined in claim 1 wherein said refuse grinding apparatus comprises a mixing apparatus and a chain grinder arranged for passage of the refuse first through the mixing apparatus and then through the chain grinder.

4. A system as defined in claim 3 wherein said mixing apparatus includes means for screening ash, glass and dirt from the refuse.

5. A system as defined in claim 1 wherein said light products separation apparatus comprises an air classifier blowing a stream of air through the refuse for removing paper, plastics, metal foils and the like from the refuse.

6. A system as defined in claim 5 characterized further to include an electrostatic separator arranged to receive said paper, plastics and metal foils and separate the same by variations in the electrostatic charges thereon.

7. A system as defined in claim 1 wherein said refuse grinding apparatus comprises a mixing apparatus and a chain grinder arranged for passage of the refuse first through the mixing apparatus and then through the chain grinder, and wherein said light products separation apparatus includes an air classifier positioned between the mixing apparatus and the chain grinder for blowing a stream of air through and removing paper, plastics, metal foils, and the like from the mixed refuse before the refuse is ground.

References Cited by the Examiner
UNITED STATES PATENTS

| | | | |
|---|---|---|---|
| 1,777,449 | 10/1930 | Rath | 202—5 |
| 1,980,244 | 11/1934 | Wright | 210—73 |
| 2,062,025 | 11/1936 | Harrington | 210—259 |
| 2,125,846 | 8/1938 | Laughlin | 210—73 |
| 2,209,613 | 7/1940 | Roeder | 71—9 |
| 2,727,809 | 12/1955 | Lust | 71—64 |
| 2,734,803 | 2/1956 | Ruskin | 23—259.1 |
| 2,755,293 | 7/1956 | McDonald | 210—73 |
| 2,798,800 | 7/1957 | Geraghty et al. | 71—9 |

MORRIS O. WOLK, *Primary Examiner.*

MAURICE A. BRINDISI, *Examiner.*